US011194368B2

(12) United States Patent
Follis et al.

(10) Patent No.: US 11,194,368 B2
(45) Date of Patent: Dec. 7, 2021

(54) ACCELEROMETER-BASED BIOMETRIC DATA

(71) Applicant: Adobe Inc., San Jose, CA (US)

(72) Inventors: Benjamin D. Follis, Redwood City, CA (US); Dennis E. Griffin, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 705 days.

(21) Appl. No.: 13/710,347

(22) Filed: Dec. 10, 2012

(65) Prior Publication Data

US 2014/0160003 A1 Jun. 12, 2014

(51) Int. Cl.
| | |
|---|---|
| *G06F 1/16* | (2006.01) |
| *G06F 3/01* | (2006.01) |
| *G06F 3/0346* | (2013.01) |
| *G06F 21/30* | (2013.01) |
| *G06F 21/31* | (2013.01) |
| *H04L 29/06* | (2006.01) |
| *G06F 21/32* | (2013.01) |
| *H04W 4/02* | (2018.01) |

(52) U.S. Cl.
CPC ............ *G06F 1/1694* (2013.01); *G06F 3/017* (2013.01); *G06F 3/0346* (2013.01); *G06F 21/30* (2013.01); *G06F 21/316* (2013.01); *G06F 21/32* (2013.01); *H04L 63/0861* (2013.01); *G06F 2221/2101* (2013.01); *G06F 2221/2111* (2013.01); *H04W 4/027* (2013.01)

(58) Field of Classification Search
CPC .................................................... G06F 3/0346

USPC ................................................. 345/156, 158
See application file for complete search history.

(56) References Cited

U.S. PATENT DOCUMENTS

| | | | |
|---|---|---|---|
| 9,104,886 B1* | 8/2015 | Dolbakian | G06F 21/62 |
| 2005/0174324 A1* | 8/2005 | Liberty | G06F 3/017 |
| | | | 345/156 |
| 2009/0036176 A1* | 2/2009 | Ure | G06F 3/044 |
| | | | 455/575.3 |
| 2009/0144639 A1* | 6/2009 | Nims | A63B 24/0059 |
| | | | 715/757 |
| 2009/0226091 A1* | 9/2009 | Goldsmith et al. | 382/189 |
| 2009/0295271 A1* | 12/2009 | Xu et al. | 313/496 |
| 2010/0217533 A1* | 8/2010 | Nadkarni | A61B 5/1117 |
| | | | 702/19 |
| 2010/0225443 A1* | 9/2010 | Bayram | G06F 21/316 |
| | | | 340/5.83 |

(Continued)

*Primary Examiner* — Christopher R Lamb
(74) *Attorney, Agent, or Firm* — FIG. 1 Patents

(57) ABSTRACT

A user can provide input to a device in a 2-dimensional manner (such as by entering the data using a stylus or finger to apply pressure to a touchscreen) or in a 3-dimensional manner (such as by moving the device in 3-dimensional space). While the user input is being received, biometric data in the form of accelerometer data is collected. The accelerometer data indicates an amount of force applied in each of one or more directions over time. The collected accelerometer data thus provides an indication of the manner in which the device was moved, whether intentionally or unintentionally, while the user input was being received. The collected accelerometer data can be used in various manners, such as to verify the user input, as a signature of the user, as an authentication value to access a service or device, and so forth.

20 Claims, 9 Drawing Sheets

(56) References Cited

U.S. PATENT DOCUMENTS

| | | | |
|---|---|---|---|
| 2011/0179289 A1* | 7/2011 | Guenther | G06F 21/32 713/189 |
| 2011/0223974 A1* | 9/2011 | Agevik | G06F 1/1626 455/566 |
| 2011/0251823 A1* | 10/2011 | Davis et al. | 702/181 |
| 2012/0007713 A1* | 1/2012 | Nasiri | G06F 1/1694 340/5.81 |
| 2013/0063389 A1* | 3/2013 | Moore | G06F 3/04883 345/174 |
| 2013/0194066 A1* | 8/2013 | Rahman | G05B 1/01 340/5.51 |
| 2015/0128067 A1* | 5/2015 | Wong | G06F 3/0486 715/748 |

* cited by examiner

ACCELEROMETER-BASED BIOMETRIC DATA

BACKGROUND

As computing technology has advanced, computers have become increasingly commonplace. Many tasks that were once performed using pen and paper have transitioned to being performed on computers. One such task is the signing of documents—where users once signed paper documents with an ink pen, some documents can now be displayed on a computer screen and signed using a stylus or similar input device. While performing such tasks on computers has various benefits, it is not without its problems. One such problem is that a signature entered on a computer can typically be copied and pasted elsewhere, resulting in the potential for forgery and uncertainty as to whether a user that supposedly signed the document actually did sign the document. Another such problem is that it can be difficult for users lacking fine motor skills to manipulate a stylus or similar input device to sign a document on a computer screen.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

In accordance with one or more aspects, a user input is received at a device. Accelerometer data that identifies movement of the device while receiving the user input at the device is also collected. The collected accelerometer data is stored as associated with the user input.

In accordance with one or more aspects, a user input is received at a device. The user input is movement of the device in 3-dimensional space by a user. Accelerometer data is collected at the device, the accelerometer data identifying the movement of the device in the 3-dimensional space. The accelerometer data is used as an authentication value of the user.

In accordance with one or more aspects, movement in 3-dimensional space of a device by a user is identified. Accelerometer data is collected at the device, the accelerometer data identifying the movement of the device in 3-dimensional space. The collected accelerometer data is stored as a signature of the user.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Accelerometer-based biometric data is discussed herein. A user can provide input to a device in a 2-dimensional (2D) manner (such as by entering the data using a stylus or finger to apply pressure to a touchscreen) or in a 3-dimensional (3D) manner (such as by moving the device in 3D space). While the user input is being received, biometric data in the form of accelerometer data is collected. The accelerometer data indicates an amount of force applied in each of one or more directions over time. The collected accelerometer data thus provides an indication of the manner in which the device was moved, whether intentionally or unintentionally, while the user input was being received.

The collected accelerometer data can subsequently be used to verify the user input. The user input can be verified by comparing the collected accelerometer data to known accelerometer data, or known shapes or patterns, to determine whether the device moved in a particular known manner. The particular known manner can be determined in various different ways, such as based on previous user inputs by the user, based on a particular user input the user was attempting to input (e.g., a shape in which the user was attempting to move the device), and so forth.

The collected accelerometer data can also be used in various other manners. For example, the collected accelerometer data can be used as a signature of the user, as an authentication value to access an online service, as an authentication value to access the device, as an authentication value to access a document, and so forth.

Figure 1:
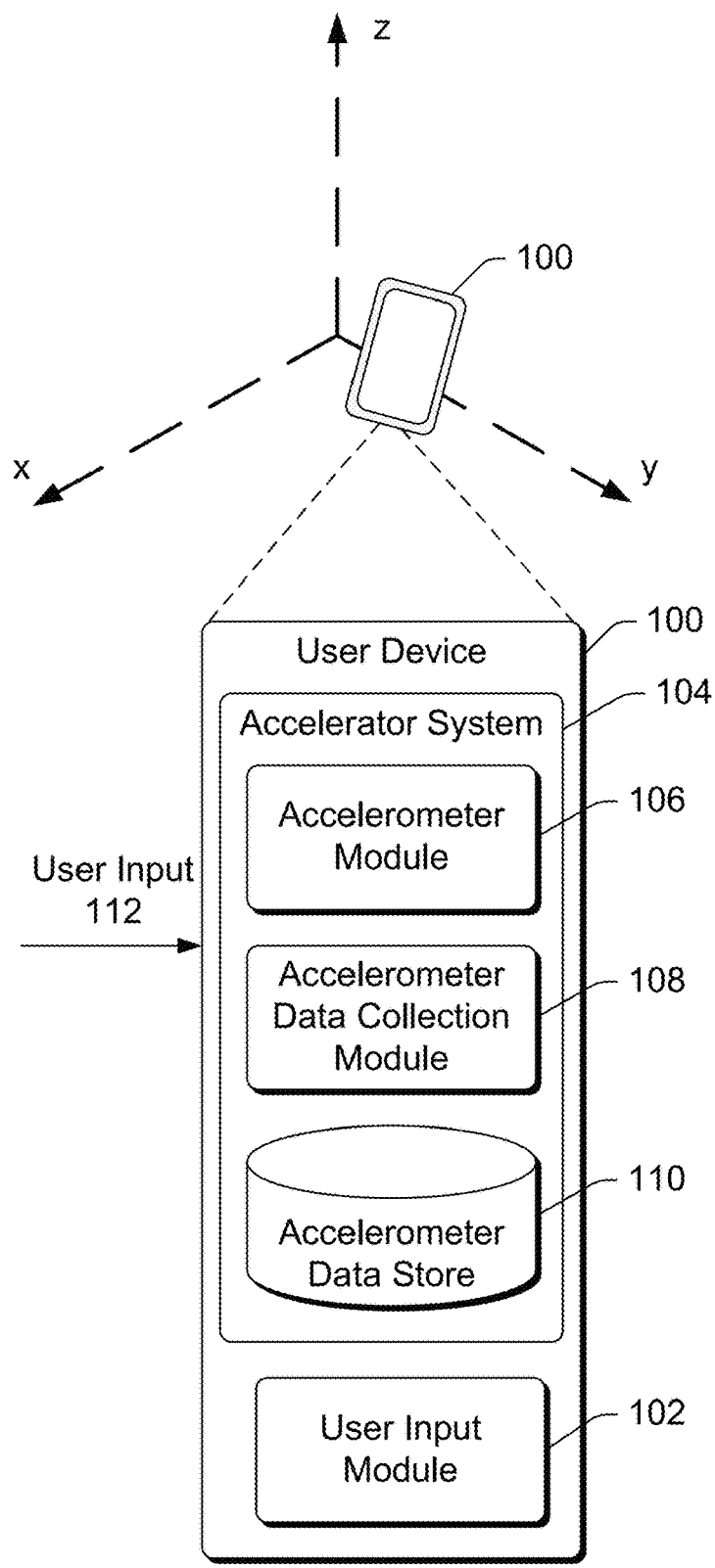
FIG. 1 is a block diagram illustrating an example user device implementing the accelerometer-based biometric data in accordance with one or more embodiments.

FIG. 1 is a block diagram illustrating an example user device 100 implementing the accelerometer-based biometric data in accordance with one or more embodiments. Device 100 can be a variety of different types of devices, such as a physical device or a virtual device. For example, device 100 can be a physical device such as a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, a kiosk, a point of sale device, and so forth. Device 100 can also be a virtual device, such as a virtual machine running on a physical device. A virtual machine can be run on any of a variety of different types of physical devices (e.g., any of the various types listed above). Thus, device 100 may range from a full resource device with substantial memory and processor resources (e.g., personal computers, game consoles) to a low-resource device with limited memory and/or processing resources (e.g., traditional set-top boxes, hand-held game consoles).

Device 100 includes a user input module 102 and an accelerator system 104 including an accelerometer module 106, an accelerometer data collection module 108, and an accelerometer data store 110. Although particular functionality is discussed herein with reference to particular modules, it should be noted that the functionality of individual modules discussed herein can be separated into multiple modules, and/or at least some functionality of multiple modules can be combined into a single module.

Accelerometer module 106 includes one or more accelerometers that detect or sense an amount of force applied along one or more axes of device 100. The one or more accelerometers typically detect or sense an amount of force applied in two dimensions (e.g., an x dimension and a y dimension in 2D space) or three dimensions (e.g., an x dimension, a y dimension, and a z dimension in 3D space). An axis of device 100 can be one of these two or three dimensions. Alternatively, an axis of device 100 can also refer to a sensitivity of the force applied in a particular dimension, and thus the one or more accelerometers can detect or sense an amount of force applied along any number of axes.

Accelerometer module 106 outputs accelerometer data over time, which is received or otherwise obtained by accelerometer data collection module 108. The accelerometer data identifies the force applied along each of the one or more axes of device 100 at a particular point in time. Collection module 108 obtains the output accelerometer data and stores the obtained accelerometer data in accelerometer data store 110.

User input module 102 receives user input 112 from a user of device 100. User input 112 can be provided to user input module 102 in any of a variety of different manners, such as writing characters using a stylus or finger on a touchscreen, touching keys of keyboard (e.g., a physical keyboard or soft keyboard displayed on an touchscreen), moving device 100 in 2D or 3D space, and so forth. User input 112 can be any type of input, and typically is input that involves physical interaction with user device 100.

Device 100 can optionally include a screen or other component to display an indication of user input 112. For example, device 100 can include a touchscreen via which user input 112 can be received and via which an indication of user input 112 can be displayed. Alternatively, device 100 need not include any such screen or other display component. For example, device 100 can be an input panel or pad via which user input 112 can be received, but which does not display any indication of user input 112.

Figure 9:
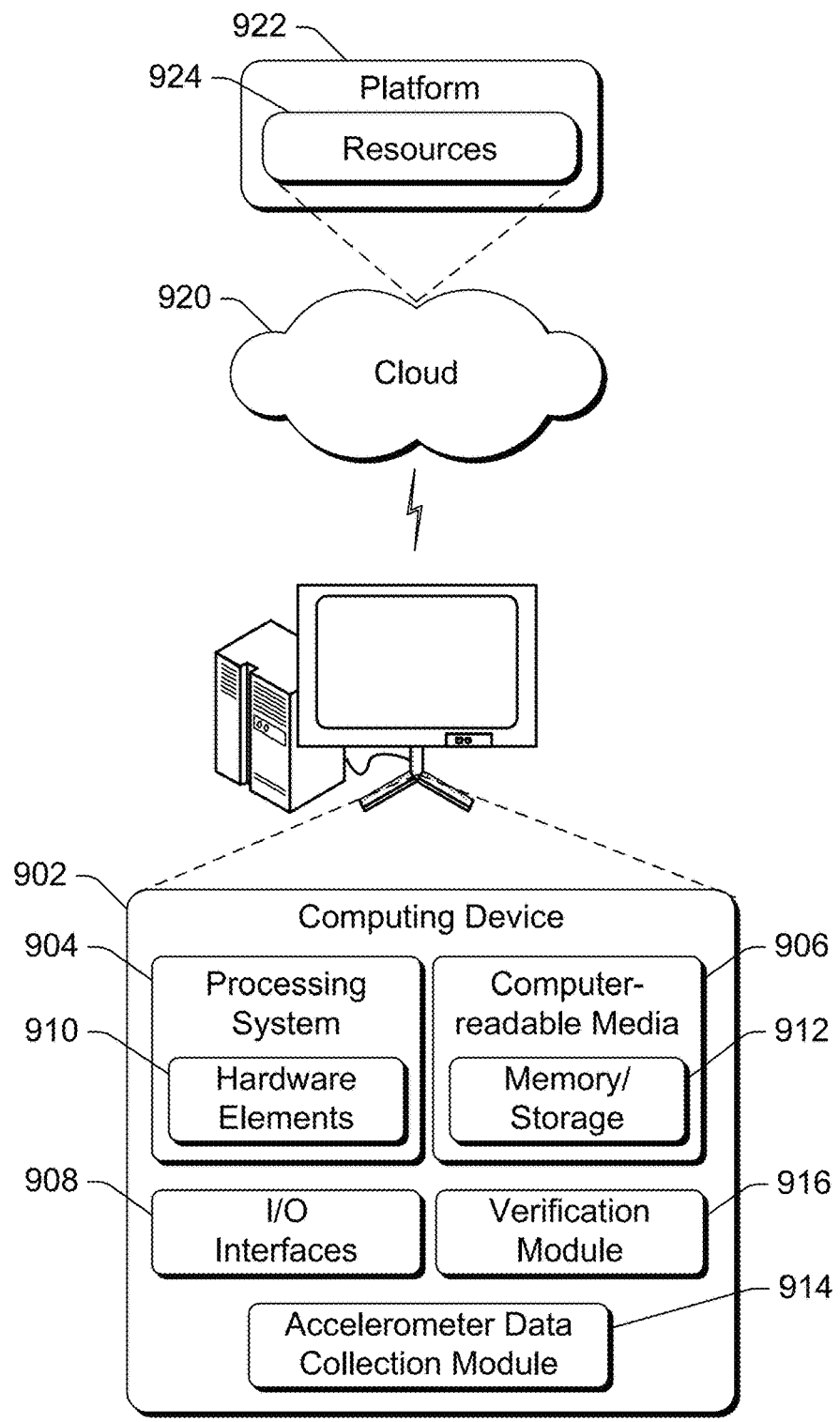
FIG. 9 illustrates an example system that includes an example computing device that is representative of one or more computing systems and/or devices that may implement the various techniques described herein.

It should be noted that, although a single device 100 is shown, device 100 can be representative of multiple devices (of the same or different types), such as multiple servers utilized to perform operations "over the cloud" as further described in relation to FIG. 9.

Figure 2:
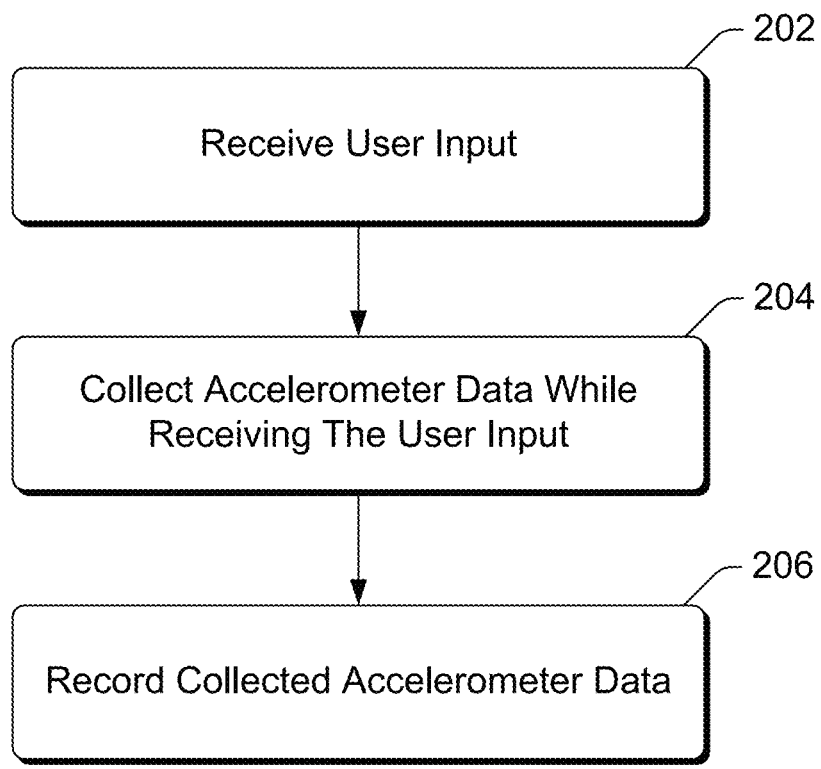
FIG. 2 is a flowchart illustrating an example process for implementing collection of the accelerometer-based biometric data in accordance with one or more embodiments.

FIG. 2 is a flowchart illustrating an example process 200 for implementing collection of the accelerometer-based biometric data in accordance with one or more embodiments. Process 200 is carried out by a device, such as user device 100 of FIG. 1, and can be implemented in software, firmware, hardware, or combinations thereof. Process 200 is shown as a set of acts and is not limited to the order shown for performing the operations of the various acts. Process 200 is an example process for implementing collection of the accelerometer-based biometric data; additional discussions of implementing collection of the accelerometer-based biometric data are included herein with reference to different figures.

In process 200, user input is received (act 202). The user input can be received in a variety of different manners, including user input in 2D and 3D space.

Figure 3:
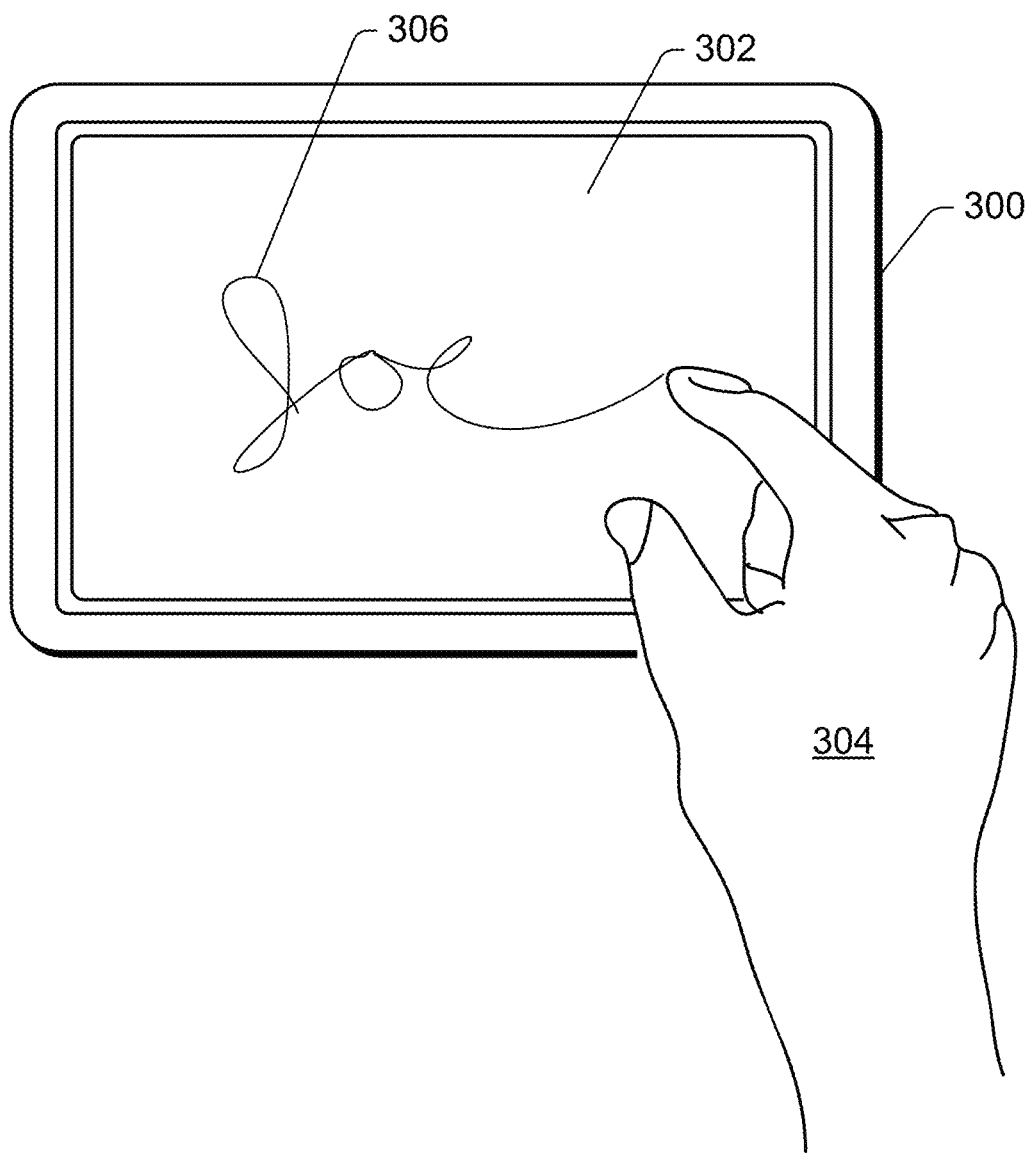
FIG. 3 illustrates an example user input in 2-dimensional space in accordance with one or more embodiments.

FIG. 3 illustrates an example user input in 2D space in accordance with one or more embodiments. FIG. 3 illustrates a device 300, which can be a device 100 of FIG. 1. Device 300 includes a touchscreen 302, and the user can provide input by applying pressure with a finger of his or her hand 304. As illustrated in FIG. 3, the user input 306 is the name "Joe", which is displayed by device 300 as the user inputs the data.

Figure 4:
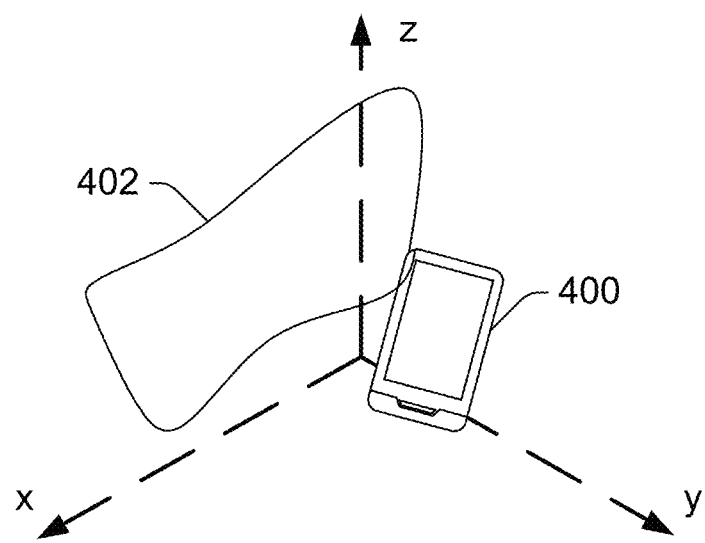
FIG. 4 illustrates an example user input in 3-dimensional space in accordance with one or more embodiments.

FIG. 4 illustrates an example user input in 3D space in accordance with one or more embodiments. FIG. 4 illustrates a device 400, which can be a device 100 of FIG. 1. The user can provide input by moving device 400 in 3D space. As illustrated in FIG. 4, the user input 402 is an approximately rectangular shape traced out in 3D space by movement of device 400.

Returning to FIG. 2, while receiving the user input, accelerometer data is collected (act 204) and recorded (act 206). Collecting accelerometer data refers to identifying accelerometer data output by the accelerometer module that is to be recorded. This accelerometer data is, for example, the accelerometer data output by accelerometer module 106 and collected by accelerometer data collection module 108 of FIG. 1. The device receiving the user input typically moves while the user input is being received, and this movement is reflected in the accelerometer data collected in act 204. The movement of the device while the user input is being received can be intentional on the part of the user, such as the user tracing a shape by moving the device through 3D space. The movement of the device while the user input is being received can also be unintentional or inadvertent on the part of the user, such as the device moving slightly as a user applies pressure to a touchscreen with a stylus or finger.

For example, referring again to FIG. 3, device 300 can move slightly in various directions as user input 306 is received. Thus, device 300 may move slightly to the left, right, up, down, away from the user, and/or towards the user at different times during receipt of user input 306 due to the pressure applied to device 300 by hand 304. These movements are reflected in accelerometer data collected by device 300.

By way of another example, referring again to FIG. 4, device 400 is moved through the 3D space as user input 402 is received. This movement is reflected in accelerometer data collected by device 400.

Returning to FIG. 2, the collected accelerometer data is recorded in act 206 as associated with the user input. The collected accelerometer data can be recorded in various manners, such as being stored in accelerometer data store 110 of FIG. 1, being stored in an accelerometer data store of another device or service, being embedded in a document, and so forth. The association between the collected accelerometer data and the user input can be maintained in various manners, such as storing an indication of the user input (and/or the user input data itself) in a same data structure as the collected accelerometer data, maintaining a table or other mapping of user input to collected accelerometer data, and so forth. As the movement of the device while the user input is being received will typically be different for different users, the accelerometer data can be used as biometric data to facilitate identifying whether a particular user actually provided the user input, as discussed in more detail below.

It should be noted that an accelerometer module (such as accelerometer module 106 of FIG. 1) can output accelerometer data at various times, and that accelerometer data is collected during times when user input is being received. The accelerometer module can be outputting accelerometer data before and/or after the user input is received, but such accelerometer data need not be collected in act 204 and/or recorded in act 206. Alternatively, the accelerometer module can be activated in response to the beginning of a user input and deactivated in response to the ending of a user input, so that all the accelerometer data output by the accelerometer module is output during times when user input is received but otherwise is not output. The beginning and/or ending of a user input can be determined in various manners, such as beginning when pressure is applied to a touchscreen and ending when pressure is no longer applied to the touchscreen, beginning when a user provides an indication (e.g., presses a button, selects an icon or menu option, provides a verbal input, etc.) that user input is beginning, and ending when a user provides an indication (e.g., presses a button, selects an icon or menu option, provides a verbal input, etc.) that the user input is ending, and so forth.

In one or more embodiments, the accelerometer data is one or more tuples each identifying one or more axes of the device receiving the user input and one or more forces applied along the one or more axes. However, it should be noted that the accelerometer data can alternatively be output by the accelerometer module using various other data structures.

The accelerometer data collected in act 204 can be collected at regular and/or irregular intervals. The accelerometer data can be collected in act 204 at the same rate that the accelerometer data is output by the accelerometer module, or alternatively the accelerometer data can be collected in act 204 at a different rate (e.g., a lower rate) than the rate that the accelerometer data is output by the accelerometer module. In one or more embodiments, the accelerometer data is collected at fixed intervals, such as every 10 milliseconds (ms) or 100 ms while the user input is being received. Alternatively, the accelerometer data can be collected at irregular intervals. For example, the accelerometer data output by the accelerometer module can be analyzed and each time the force along a particular axis changes by at least a threshold amount (e.g., 5%), then the accelerometer data is collected by identifying an indication of the force (or change in force) along each axis as well as a time when the change occurred (e.g., a timestamp, or offset time relative to when the user input began), and this indication of the force (or change in force) and time when the change occurred is recorded.

Figure 5:
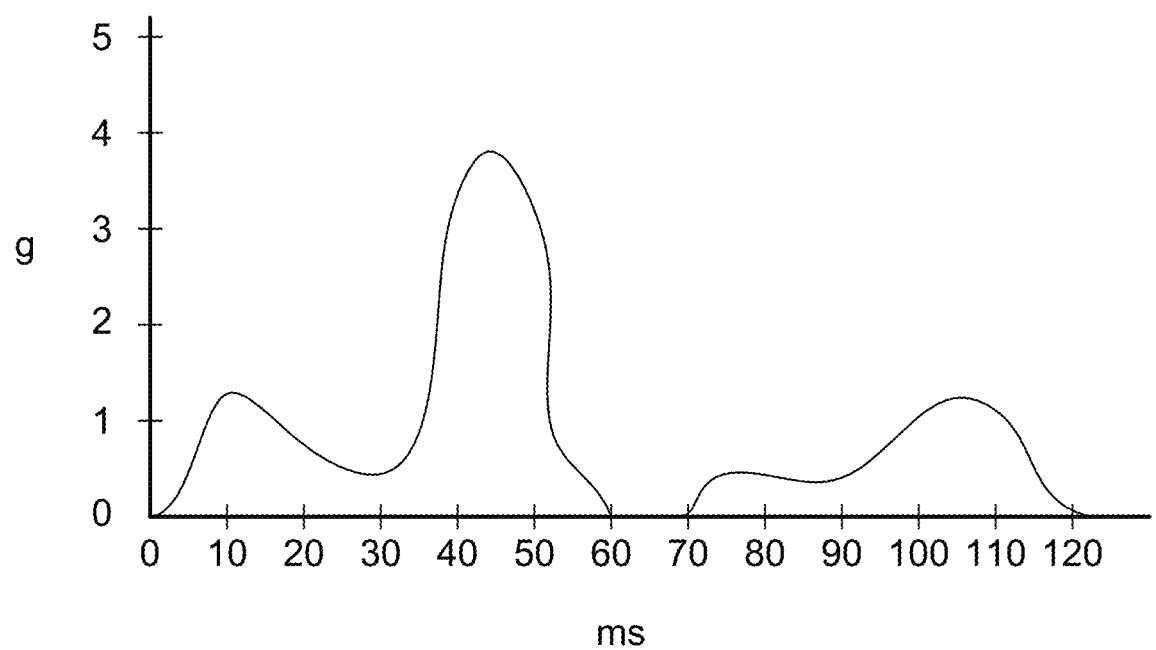
FIG. 5 illustrates an example graph of collected accelerometer data over time in accordance with one or more embodiments.

Regardless of the intervals at which the accelerometer data is collected and recorded, the recorded accelerometer data provides an indication of an amount of force along one or more axes over time. FIG. 5 illustrates an example graph 500 of collected accelerometer data over time in accordance with one or more embodiments. The horizontal axis of graph 500 is time in milliseconds, and the vertical axis of graph 500 is force in gravity (g) along a particular axis. As illustrated in FIG. 5, the force applied along that particular axis varies over time while the user input is being received. Although a single graph 500 is illustrated in FIG. 5, it should be noted that multiple similar graphs of force along other axes can also be generated.

The recorded accelerometer data can be verified at some point in time after being received by the device, which is also referred to as verifying the user input associated with the accelerometer data. Verifying the accelerometer data refers to confirming that the accelerometer data matches or is otherwise appropriate for the desired user input. This verification can include, for example, comparing the accelerometer data to previously received accelerometer data for user inputs of the user, comparing the accelerometer data to other known inputs, comparing a track of the accelerometer data against known tracks, and so forth as discussed in more detail below.

Figure 6:
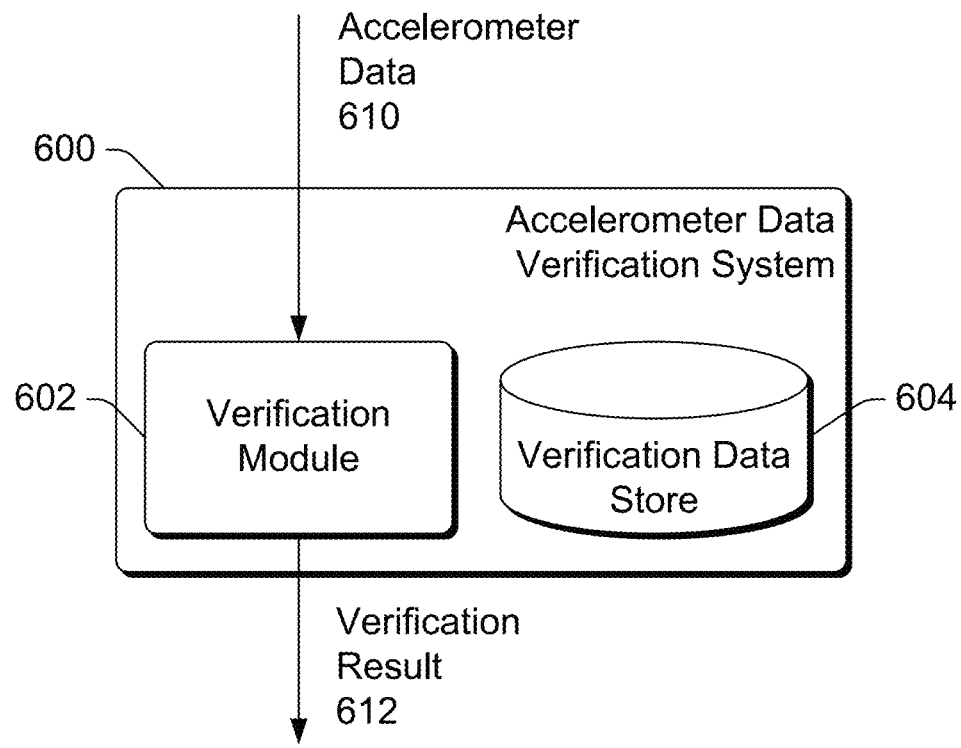
FIG. 6 illustrates an example accelerometer data verification system in accordance with one or more embodiments.

FIG. 6 illustrates an example accelerometer data verification system 600 in accordance with one or more embodiments. System 600 includes a verification module 602 and a verification data store 604. Verification system 600 obtains accelerometer data 610 associated with a user input. Verification module 602 analyzes accelerometer data 610 in light of verification data maintained in verification data store 604 to verify the user input associated with accelerometer data 610. Verification module 602 outputs a verification result 612 indicating whether the user input associated with accelerometer data 610 is verified.

Verification system 600 can be implemented by a variety of different types of devices, analogous to user device 100 of FIG. 1. Verification system 600 can be implemented on the same device as collects the accelerometer data, such as user device 100. Alternatively, verification system 600 can be implemented on one or more different devices than collects the accelerometer data, such as one or more devices separate from user device 100.

Figure 7:
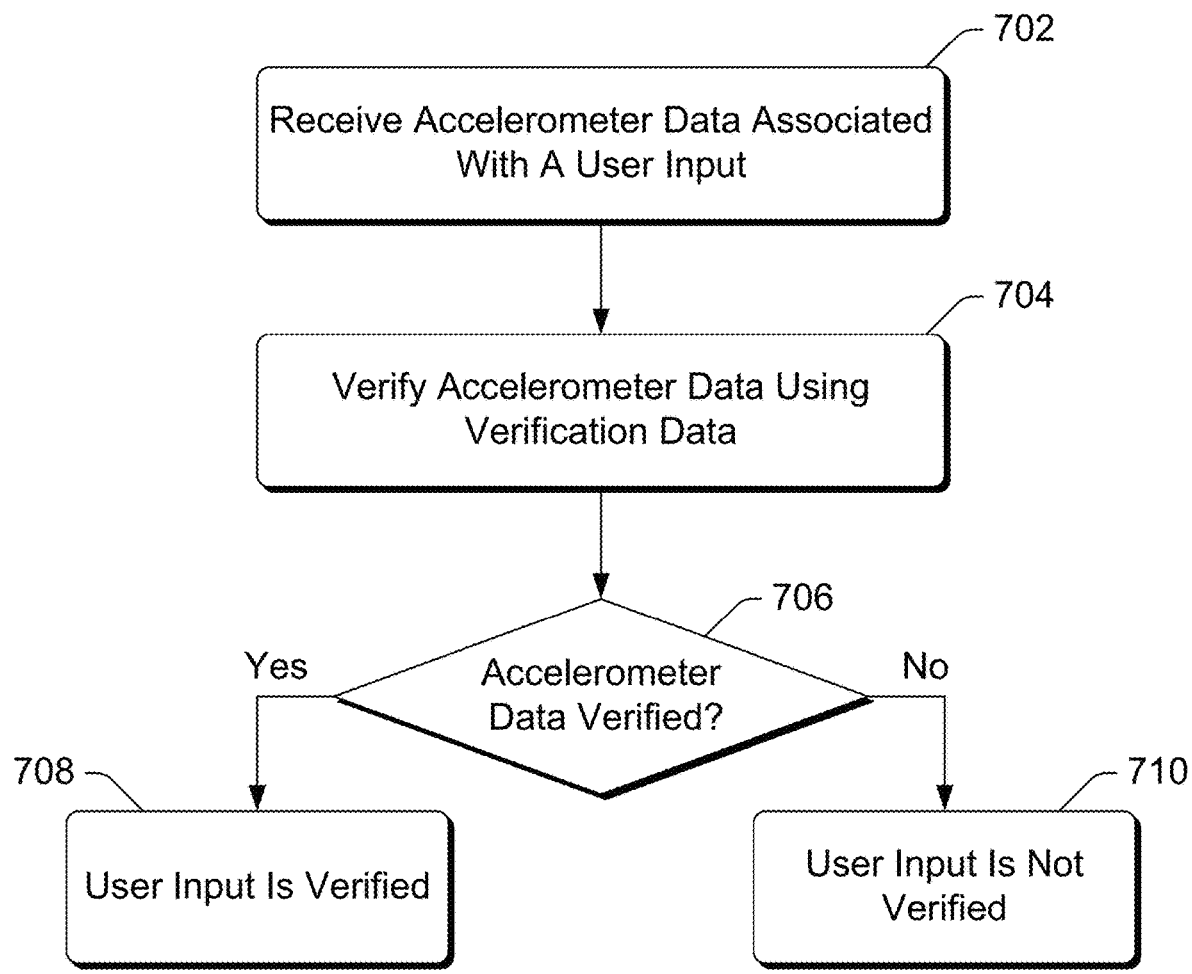
FIG. 7 is a flowchart illustrating an example process for verifying a user input in accordance with one or more embodiments.

FIG. 7 is a flowchart illustrating an example process 700 for verifying a user input in accordance with one or more embodiments. Process 700 is carried out by a verification system, such as accelerometer data verification system 600 of FIG. 6, and can be implemented in software, firmware, hardware, or combinations thereof. Process 700 is shown as a set of acts and is not limited to the order shown for performing the operations of the various acts. Process 700 is an example process for verifying a user input; additional discussions of verifying a user input are included herein with reference to different figures.

In process 700, accelerometer data associated with a user input is received (act 702). The accelerometer data is collected at a user device while receiving user input, as discussed above. The accelerometer data can be received from the user device or alternatively via one or more other devices or intermediaries.

The accelerometer data is verified using verification data (act 704). The accelerometer data is verified by comparing the accelerometer data received in act 702 to the verification data. The verification data can be known accelerometer data for the user and/or user input, and can be obtained in various manners, such as from previous user inputs, provided by another device or module, and so forth. For example, a collection of accelerometer data from multiple previous user inputs by the user can be recorded, and the received accelerometer data can be compared to the collection of accelerometer data to determine whether the received accelerometer data is at least approximately the same as the collection of accelerometer data. By way of another example, the received accelerometer data can be compared to a collection of known accelerometer data for a particular shape or pattern that was to be input as the user input associated with the received accelerometer data to determine whether the received accelerometer data is at least approximately the same as the collection of accelerometer data.

Whether the received accelerometer data is at least approximately the same as a collection of accelerometer data can be determined in various manners. For example, if at least a threshold number of points in the received accelerometer data (e.g., as determined by time offsets from the beginning of the user input) are within at least a threshold amount of accelerometer data in the collection, then the received accelerometer data can be determined to be at least approximately the same as the collection of accelerometer data. By way of another example, the collection of accelerometer data can be an average of accelerometer data (e.g., an average of the accelerometer data collected from multiple previous user inputs), and if at least a threshold number of points in the received accelerometer data are within at least a threshold amount of the average of accelerometer data, then the received accelerometer data can be determined to be at least approximately the same as the collection of accelerometer data. By way of yet another example, a classifier (e.g., a support vector machine) can be trained based on the collection of accelerometer data using any of a variety of public and/or proprietary techniques, and determine based on this training whether the received accelerometer data is at least approximately the same as the collection of accelerometer data.

In verifying the received accelerometer data, the received accelerometer data can be analyzed in various manners. In one or more embodiments, the shape of a graph of the accelerometer data over time is analyzed. For example, a graph of the received accelerometer data over time can be analyzed and a determination made as to whether the graph has, along one or more axes, a particular shape (e.g., a shape indicated by the verification data). Any of a variety of public and/or proprietary techniques can be used to compare the graph of the received accelerometer data to a particular shape and determine whether the graph of the received accelerometer data is at least approximately the same as the particular shape.

In other embodiments, the force along one or more axes at particular points in time can be analyzed. For example, the verification data can indicate that, at particular points in time, the force along one or more axes as indicated by the received accelerometer data is to have a particular value. These particular points can be identified in various manners, such as being fixed times (e.g., every 10 ms after the user input begins), or variable times (e.g., when particular conditions regarding the user input are satisfied, at random times, and so forth). These particular points in time can optionally be associated with particular aspects of the user input. For example, the particular points in time can be the time when the user is expected to be inputting a particular portion of a character (e.g., the top loop of a cursive letter J).

The verification data can alternatively be a known shape or pattern itself. The accelerometer data can be verified by creating a track, in 2D or 3D space, representing the shape or pattern that was input. This created track can then be compared to a known shape or pattern of the desired user input to determine whether the created track is at least approximately the same as the shape or pattern of the desired user input.

Whether the created track is at least approximately the same as the shape or pattern of the desired user input can be determined in different manners, such as by classifying the created track as a particular shape and determining whether the classified shape of the created track is the shape or pattern of the desired user input expected. For example, any of a variety of public and/or proprietary shape or pattern classification algorithms (e.g., classifiers such as support vector machines or other algorithms) can be used to classify the created track as a particular shape or pattern, and a determination readily made as to whether the classification of the created track is the shape or pattern of the desired user input (e.g., if the desired user input is a rectangle shape, then check whether the created track is classified as a rectangle).

Process 700 proceeds based on whether the accelerometer data is verified (act 706). If the accelerometer data is verified, then the accelerometer data is verified as matching or otherwise being appropriate for the desired user input, and an indication that the user input associated with the accelerometer data is verified is output (act 708). However, if the accelerometer data is not verified, then the accelerometer data is not verified as matching or otherwise being appropriate for the desired user input, and an indication that the user input associated with the accelerometer data is not verified is output (act 710). The indications in acts 708 and 710 can be output in various manners, such as being displayed or otherwise presented to a user of the verification system, being recorded in a data store of the verification system, being provided to another device or system, and so forth.

In process 700, the accelerometer data associated with a user input is received. It should be noted that the data input as the user input can be received as well. For example, if the user input is a signature input via a touchscreen, then both the locations touched on the touchscreen as the user input as well as the time when those locations were touched can also be received in act 702. These locations touched and/or the time when the locations are touched (e.g., indicating a pace of the user input) are also referred to as the user input data. The user input can be recorded at the same rate as the accelerometer data is recorded, or alternatively at different rates. However, the user input data need not be provided to the verification system, and the verification of the user input can be performed without the user input data.

If the user input data is received in act 702, then in act 704 the verification of the accelerometer data can be based at least in part on the user input data. For example, the verification data can indicate that the force along one or more axes as indicated by the received accelerometer data is to have particular values at particular points in time, such as the time when the topmost part of each letter in the user input is input. If the user input is a signature input via a touchscreen, a set of times at which the topmost part of each letter is input can be readily identified from the data input as user input, and the force along one or more axes at each time in the set of times can be readily identified from the received accelerometer data.

The user input data can also optionally be verified in addition to the accelerometer data being verified. The user input data can be recorded at the same intervals as the accelerometer data as discussed above (e.g., recording locations in 2D space of a finger, stylus, etc. every 10 ms or at other intervals). The user input data can be verified in any of a variety of different manners, such as by comparing the user input data to previously received user input data (e.g., if the user input is a signature, then comparing the data input as the signature to data received for previously provided signatures), analogous to the comparing of accelerometer data as discussed above. The user input data can be verified by analyzing the shape of the user input (as compared to the shape of previous user inputs from the user), by analyzing the pace of the user input (as compared to the pace of previous user inputs from the user), and so forth.

Figure 8:
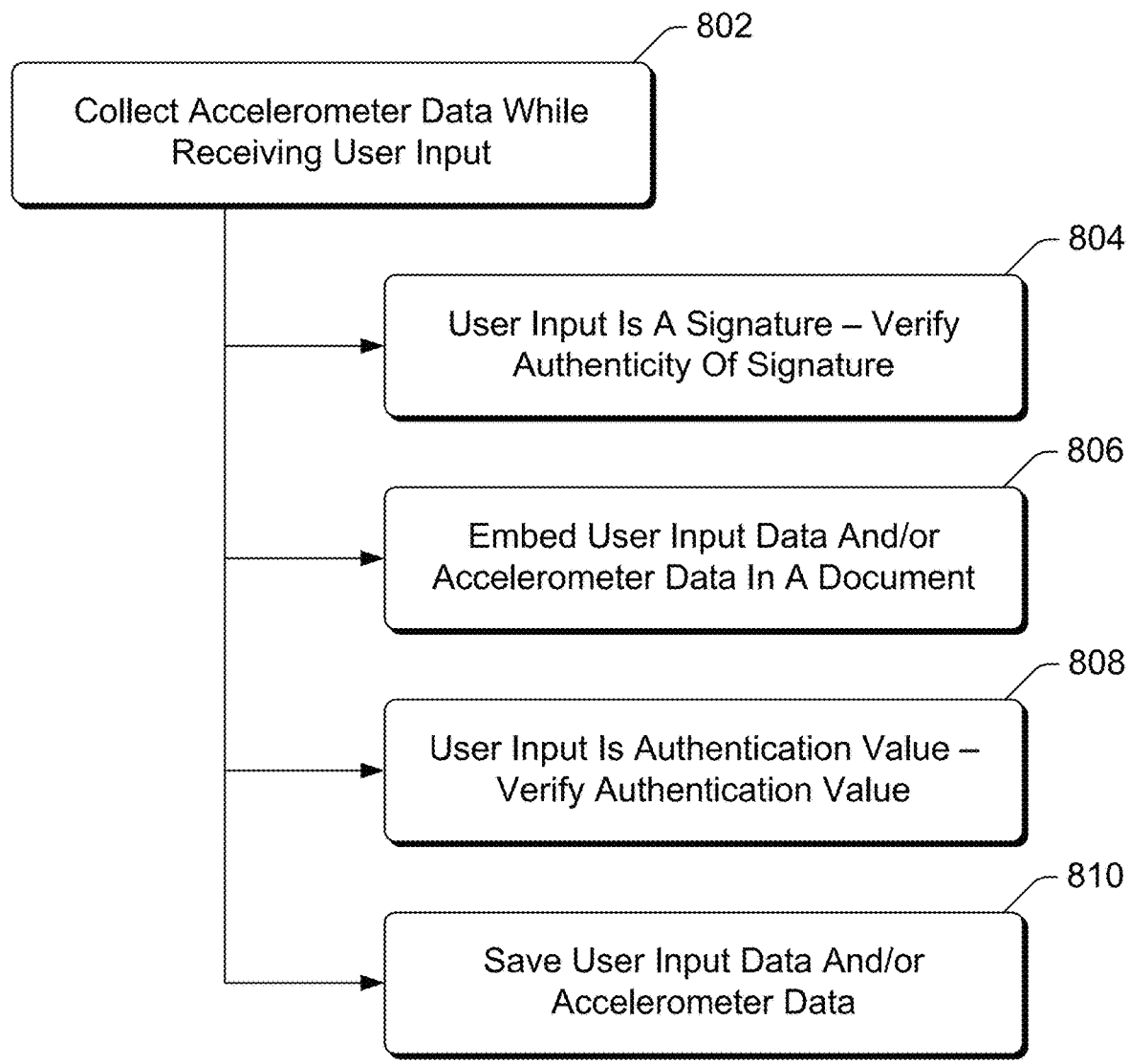
FIG. 8 is a flowchart illustrating an example process for using the accelerometer-based biometric data in accordance with one or more embodiments.

The techniques discussed herein support various usage scenarios. FIG. 8 is a flowchart illustrating an example process 800 for using the accelerometer-based biometric data in accordance with one or more embodiments. Process 800 is carried out by a device, such as user device 100 of FIG. 1, and can be implemented in software, firmware, hardware, or combinations thereof. Process 800 is shown as a set of acts and is not limited to the order shown for performing the operations of the various acts. Process 800 is an example process for using the accelerometer-based biometric data; additional discussions of using the accelerometer-based biometric data are included herein with reference to different figures.

In process 800, accelerometer data is collected while a user input is being received (802). The user input can be a user input in 2D or 3D space, as discussed above.

The user input can be a signature of the user, in which case the authenticity of the signature can be verified by a verification system (act 804). The signature of the user can be the user's name, or any other series of characters or shapes the user chooses to signify his or her signed name or identity. The signature can be signed in 2D space (e.g., analogous to the discussion above regarding FIG. 3) or by being traced with the user device in 3D space (e.g., analogous to the discussion above regarding FIG. 4). The authenticity of the signature is verified by the accelerometer data verification system analyzing the accelerometer data collected while receiving the user input. If the collected accelerometer data is verified using verification data as discussed above then the signature is verified as being authentic; if the accelerometer data is not verified using verification data as discussed above then the signature is not verified as being authentic (e.g., is determined to be a forgery).

It should be noted that, by allowing a user signature to be input by moving the user device in 3D space, users lacking fine motor skills can use the device to enter their signature. For example, a user may lack the ability to grip a stylus and write his or her name, but may still be able to enter a signature by moving the entire user device in 3D space.

The user input data and/or accelerometer data can also be embedded in a document (act 806). Such user input data can be a signature of the user as discussed above (the authenticity of which can optionally be verified as in act 804 above), or alternatively other data. For example, the user input data can be a check mark or "X" selecting a particular option in a document (e.g., in a form being filled out by the user), a comment or other markup in a document, and so forth. The user input data and/or accelerometer data can be embedded in the document in different manners, and can vary based on the data structure used to store the document. For example, the user input data and/or accelerometer data can be included in metadata associated with a document, can be included as hidden or otherwise non-visible data in the document, and so forth.

It should be noted that the embedded user input data and/or accelerometer data can be in 3D space and is not limited to 2D space (e.g., as paper and pen would be). Thus, if the document is subsequently displayed, a graph of the user input data and/or accelerometer data in 3D space can be displayed, optionally allowing the user to rotate, spin, and so forth a 3D representation of the user input data and/or accelerometer data.

The user input can also be an authentication value used to access a service, data, or other resource, and the authentication value can be verified by a verification system (act 808). The authentication value can be a password, code, key, and so forth. The authentication value can be used, if verified, to determine whether the user is permitted to log into or otherwise access a device (e.g., the device to which the user input is input), whether the user is permitted to log into or otherwise access a service (e.g., an online service or other remote service accessed via the Internet or other network), whether the user is permitted to access a particular document, and so forth. The authentication value can be entered in 2D space (e.g., analogous to the discussion above regarding FIG. 3) or by being traced with the user device in 3D space (e.g., analogous to the discussion above regarding FIG. 4).

The authentication value is verified by the accelerometer data verification system analyzing the accelerometer data collected while receiving the user input. If the accelerometer data is verified using verification data as discussed above then the authentication value is verified; if the accelerometer data is not verified using verification data as discussed above then the authentication value is not verified. For example, a user may have a password to access his or her user device or an online service that is a particular shape traced in 3D space with the user device, and the verification system allows the user to access the user device or online service only if the accelerometer data is verified as matching or otherwise being appropriate for that particular shape. By way of another example, a user may be informed (e.g., verbally or via another communication channel) to trace a particular shape (e.g., a square) in 3D space with the user device in order to access a document, and the verification system allows the user to access (e.g., read and/or modify) the document only if the accelerometer data is verified as matching or otherwise being appropriate for a square. By way of yet another example, a user may be informed (e.g., verbally or via another communication channel) to trace a particular shape (e.g., a pyramid) in 3D space with the user device in order to indicate acceptance to a contract or agreement (e.g., as described in a document), and the verification system determines acceptance of the contract or agreement only if the accelerometer data is verified as matching or otherwise being appropriate for the particular shape (e.g., a pyramid).

It should be noted that, by allowing an authentication value to be input by moving the user device in 3D space, users lacking fine motor skills can use the device to enter the authentication value. For example, a user may lack the ability to grip a stylus and write his or her password, but may still be able to enter the password by moving the entire user device in 3D space.

The user input data and/or accelerometer data can also be saved (act 810). Such user input data can be a signature of the user as discussed above (the authenticity of which can optionally be verified as in act 804 above), or alternatively other data. The user input data and/or accelerometer data can be stored in an accelerometer data store (e.g., store 110 of FIG. 1), in another data store of the user device, in another data store accessible to the user device (e.g., via a network), and so forth. The user input data and/or accelerometer data can be subsequently provided by the user device, such as when the user desires to sign a document, provide an authentication value to access a service or document, and so forth. The user input data and/or accelerometer data can be subsequently provided by the user device when a user request to provide the data is received, such as by entering of another authentication value or signature, entering a verbal authorization to provide the data, and so forth. Thus, for example, the user can enter his or her signature or authorization value once by tracing the signature or authorization value in 3D space with the user device, and save the accelerometer data (and/or user input data) collected while tracing the signature or authorization value. The saved accelerometer data and/or user input data can be later provided to access one or more services, one or more documents, and so forth.

Different ones of these usage scenarios can also be combined together. For example, a person (also referred to as the sender) can send a contract for signature by another person (also referred to as the signer), the contract being subsequently signed by the signer if the signer agrees to the terms of the contract. The sender and signer of the contract agree on some pre-defined shape in 3D space that the signer will mark upon the contract to signify agreement to the contract's terms. This shape may or may not be kept secret by the sender and signer, and if kept secret can serve as a shared secret between the sender and signer that can be used to help verify the identity of the signer (e.g., persons other than the signer would not know what pre-defined shape to mark upon the contract). If the shape is not kept secret by the sender and signer, then a service operating as an intermediary between the sender and signer can obtain the contract and an indication of the pre-defined shape from the signer, and can present to the signer instructions to describe the shape that he or she is to trace. In either case, the signer indicates that they are prepared to begin tracing the shape, at which point the accelerometer data is collected. When the signer has completed tracing the shape, he or she indicates completion. At this point, an accelerator data collection module converts the collected accelerometer data into a 3D representation of the motion of the device through space, possibly as a 3D plot of points, a solid line, or a projection into 2 dimensions onto the contract. This rendering is presented to the signer. If the signer wishes that rendering to constitute his or her signature, then he or she can indicate acceptance (e.g., to the service operating as an intermediary), or if not, the signer can be allowed to re-attempt tracing the shape. Once the signer has accepted the rendering, a rendering of the collected accelerometer data is impressed onto the contract document. This impression may be in the form of a projection into 2 dimensions, a 3D representation such as VRML (Virtual Reality Modeling Language), and so forth.

Various actions performed by various modules are discussed herein. A particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

FIG. 9 illustrates an example system generally at 900 that includes an example computing device 902 that is representative of one or more computing systems and/or devices that may implement the various techniques described herein. This is illustrated through inclusion of accelerator data collection module 914 (which can be an accelerator data collection module 108 of FIG. 1) and a verification module 916 (which can be a verification module 602 of FIG. 6). Although both modules 914 and 916 are illustrated in FIG. 9, it should be noted that computing device 902 may include both modules 914 and 916, or alternatively include only one of modules 914 and 916. Computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interfaces 908 that are communicatively coupled, one to another. Although not shown, computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

Processing system 904 is representative of functionality to perform one or more operations using hardware. Accordingly, processing system 904 is illustrated as including hardware elements 910 that may be configured as processors, functional blocks, and so forth. This may include implementation in hardware as an application specific integrated circuit or other logic device formed using one or more semiconductors. Hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

Computer-readable storage media 906 is illustrated as including memory/storage 912. Memory/storage 912 represents memory/storage capacity associated with one or more computer-readable media. Memory/storage component 912 may include volatile media (such as random access memory (RAM)) and/or nonvolatile media (such as read only memory (ROM), Flash memory, optical disks, magnetic disks, and so forth). Memory/storage component 912 may include fixed media (e.g., RAM, ROM, a fixed hard drive, and so on) as well as removable media (e.g., Flash memory, a removable hard drive, an optical disc, and so forth). Computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Input devices can also include one or more accelerometers to detect or sense movement of computing device 902. Examples of output devices include a display device (e.g., a monitor or projector), speakers, a printer, a network card, tactile-response device, and so forth. Thus, computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. Computing device 902 may be configured to implement particular instructions and/or functions corresponding to the software and/or hardware modules. Accordingly, implementation of a module that is executable by computing device 902 as software may be achieved at least partially in hardware, e.g., through use of computer-readable storage media and/or hardware elements 910 of processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of computing device 902 and are not limited to the specific examples of the techniques described herein. This functionality may also be implemented all or in part through use of a distributed system, such as over a "cloud" 920 via a platform 922 as described below.

Cloud 920 includes and/or is representative of a platform 922 for resources 924. Platform 922 abstracts underlying functionality of hardware (e.g., servers) and software resources of cloud 920. Resources 924 may include applications and/or data that can be utilized while computer processing is executed on servers that are remote from computing device 902. Resources 924 can also include services provided over the Internet and/or through a subscriber network, such as a cellular or Wi-Fi network.

Platform 922 may abstract resources and functions to connect computing device 902 with other computing devices. Platform 922 may also serve to abstract scaling of resources to provide a corresponding level of scale to encountered demand for resources 924 that are implemented via platform 922. Accordingly, in an interconnected device embodiment, implementation of functionality described herein may be distributed throughout system 900. For example, the functionality may be implemented in part on computing device 902 as well as via platform 922 that abstracts the functionality of the cloud 920.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
outputting, by a device, information identifying a particular shape to be traced in three-dimensional space through movement of the device as a whole;
receiving, by the device, user input data describing user input of a user signature within an electronic document using a touchscreen;
generating, by the device, accelerometer data from an accelerometer, the accelerometer data describing the movement of the device in three dimensional space;
embedding, by the device, the user input data and the accelerometer data within the electronic document; and
outputting, by the device, the electronic document as including the embedded user input data and the embedded accelerometer data as configured to verify the user signature based at least in part on a comparison of the accelerometer data as having the particular shape identified by the information output by the device.

2. A method as recited in claim 1, wherein the user input data further comprises a shape and pace of the user input of the user signature within the electronic document using a touchscreen.

3. A method as recited in claim 1, wherein the generating accelerometer data from an accelerometer comprises collecting the accelerometer data in response to a beginning of the user input.

4. A method as recited in claim 1, wherein the generating accelerometer data from an accelerometer comprises collecting the accelerometer data at regular intervals during the user input.

5. A method as recited in claim 1, wherein the generating accelerometer data from an accelerometer comprises collecting the accelerometer data at irregular intervals during the user input.

6. A method as recited in claim 1, wherein the accelerometer data comprises an indication of a force along an axis as well as a time, at which, a change in the force occurred.

7. A method as recited in claim 1, wherein the receiving the user input comprises receiving a user input that is an authentication value to access a service, and further comprising providing the accelerometer data for receipt by a verification system to determine whether the user is permitted to access the service.

8. A method as recited in claim 1, wherein the verifying indicates acceptance of a contract or agreement included as part of the electronic document based on the accelerometer data as corresponding with the particular shape.

9. A method comprising:
receiving, by at least one computing device, an electronic document having associated metadata, the associated metadata including:
user input data describing user input of a user signature within the electronic document using a touchscreen of a device; and
accelerometer data describing movement of the device in three-dimensional space and is collected responsive to information output to trace a particular shape in three-dimensional space;
extracting, by the at least one computing device, the associated metadata and the user signature from the electronic document;
verifying, by the at least one computing device, the user signature by comparing the user input data with previous user input data and verifying the accelerometer data of the associated metadata as corresponding to the particular shape as indicated by the information; and
outputting, by the at least one computing device, a result of the verifying for output in a user interface.

10. A method as recited in claim 9, further comprising allowing device access based on the result of the verifying.

11. A method as recited in claim 9, further comprising allowing online access to an online service based on the result of the verifying.

12. A method as recited in claim 9, further comprising storing the user input data and accelerometer data.

13. A method as recited in claim 9, wherein the verification data comprises an indication of a force, at particular points in time, along one or more axes as indicated by the received accelerometer data.

14. A method as recited in claim 9, wherein the user signature is an authentication value including a password, code, or key.

15. A system comprising:
means for outputting information identifying a particular shape to be traced in three dimensional space by a device;
means for generating accelerometer data from an accelerometer as a user signature, the accelerometer data describing movement of the device as a whole in three-dimensional space;
means for embedding the accelerometer data within metadata associated with an electronic document; and
means for outputting the electronic document as including the associated metadata, in which, the associated metadata is configured to verify the user signature based on a comparison of the accelerometer data as corresponding with the particular shape.

16. A method as recited in claim 15, wherein the generating accelerometer data from an accelerometer comprises collecting the accelerometer data at regular intervals.

17. A method as recited in claim 15, wherein the generating accelerometer data from an accelerometer comprises collecting the accelerometer data at irregular intervals.

18. A method as recited in claim 15, wherein the generating accelerometer data from an accelerometer comprises collecting the accelerometer data in response to a beginning of a user input.

19. A method as recited in claim 15, wherein the accelerometer data comprises an indication of a force along an axis as well as a time, at which, a change in the force occurred.

20. A method as recited in claim 15, wherein the verifying indicates acceptance of a contract or agreement included as part of the electronic document based on the accelerometer data as corresponding with the particular shape.

* * * * *